United States Patent
Kobayashi

Patent Number: 5,159,909
Date of Patent: Nov. 3, 1992

[54] VERTICAL INTERNAL COMBUSTION ENGINE WITH OVERHEAD VALVES

[75] Inventor: Kazuyuki Kobayashi, Nagoya, Japan

[73] Assignee: Mitsubishi Jukogyo Kabushiki Kaisha, Tokyo, Japan

[21] Appl. No.: 621,019

[22] Filed: Nov. 30, 1990

[30] Foreign Application Priority Data

Feb. 22, 1990 [JP] Japan ................. 2-41522
Mar. 27, 1990 [JP] Japan ................. 2-30493[U]

[51] Int. Cl.⁵ ............................................. H01L 3/00
[52] U.S. Cl. ........................... 123/188.14; 123/41.65
[58] Field of Search ............ 123/41.56, 41.63, 41.65, 123/41.69, 41.7, 195 A, 195 HC, 196 W, 198 R, 193 H, 188.14

[56] References Cited

U.S. PATENT DOCUMENTS

| | | | |
|---|---|---|---|
| 4,381,743 | 5/1983 | Mair | 123/188 M |
| 4,693,215 | 9/1987 | Sugiyama et al. | 123/188 M |
| 4,864,981 | 9/1989 | Takada | 123/90.27 |
| 5,000,126 | 3/1991 | Isaka et al. | 123/41.65 |

Primary Examiner—Noah P. Kamen
Attorney, Agent, or Firm—McGlew & Tuttle

[57] ABSTRACT

The invention provides a vertical internal combustion engine with overhead valves wherein a crankshaft is vertically arranged and the cylinder is horizontally arranged. A carburetor is arranged on one side of the cylinder and a muffler is arranged on another side of the cylinder, opposite the carburetor. A suction port is connected to the carburetor by a horizontal straight line portion and a curved portion, leading from the horizontal straight line portion to a suction valve. The horizontal straight line portion includes a center line and the carburetor includes a center which is substantially aligned with the center line of the horizontal straight line portion, along a straight line. The exhaust port is connected to the muffler by an exhaust passage having a center line which passes through the center of the exhaust port and crosses the center line of the horizontal straight line portion, diagonally from below. According to another aspect of the invention, the suction port is connected to the carburetor by a horizontal straight line portion and a curved portion, leading to a suction valve, wherein the center line of the horizontal straight portion and the center of the carburetor are aligned and the curved portion leads smoothly from an end of the horizontal straight line portion to the suction valve.

6 Claims, 8 Drawing Sheets

VERTICAL INTERNAL COMBUSTION ENGINE WITH OVERHEAD VALVES

FIELD OF THE INVENTION AND RELATED ART STATEMENT

The present invention relates to a vertical internal combustion engine with overhead valves, wherein its crankshaft is vertically arranged.

One sample of the conventional internal vertical combustion engine with overhead valves is presented in FIG. 8, FIG. 9, and FIG. 10. As is shown in FIG. 8, a cylinder block 1 is provided comprising cylinder barrel 1A, whose center line is horizontally level. A cylinder head 1B and cylinder head cover 1C are provided. A crankcase 2 is connected with cylinder barrel 1A of cylinder block 1. In the center of the crank case 2, crankshaft 4 is supported vertically due to bearing 3. A piston 5 is provided, connected to connecting rod 6.

In the cylinder head 1B, suction valve 7 and exhaust valve 8 are arranged as overhead valves. The suction valve 7 and exhaust valve 8 constitute a valve mechanism comprising camshaft 9 (shown in FIG. 9) rotating synchronously with crankshaft 4, a pair of push rods 107 and 108 in both the upper and lower parts, which are caused to shuttle in a straight line by the rotation of the camshaft 9, a pair of rocker arms 117 and 118 caused to move up and down by the actuation of the push rods 107 and 108, and return spring 127 tied to each valve 7 and 8.

Seen from cylinder-head cover 1C (FIG. 10), suction port 137 is open on the right side of cylinder head 1B, and exhaust port 138 is open on the left side. That is, suction port 137 and exhaust port 138 are open so that suction and exhaust gas may flow crosswise. The suction valve 7 and the exhaust valve 8 are arranged parallel to each other on the same vertical surface and suction valve 7 is in the higher position. As shown in FIG. 10, suction port 137 is between push rod 107 for the suction valve and push rod 108 for the exhaust valve, and it slopes up to suction valve 7 along an imaginary straight line.

In the cylinder head 1B, the bottom of the opening of suction port 137 is lower in position than the top of opening of exhaust port 138.

The part at which carburetor 14 is connected with the opening of suction port 137 is the same height as the part at which muffler 16 is connected with the opening of exhaust port 138.

Carburetor 14 is connected directly with the opening of the suction port 137, air cleaner 15 is connected with the carburetor 14, and muffler 16 is connected with the opening of exhaust port 138. 17 is an elbow connecting carburetor 14 with air cleaner 15, and 18 is an air cleaner element.

As shown in FIG. 8 and 9, baffle cover 19 is placed over cylinder block 1 and crankcase 2, wherein crankshaft 4, flywheel 20 and fan 21 are arranged. 22 is recoil starter, and 23 is a fuel tank. Spark plug 24 and starter motor 25 are arranged on the same side as muffler 16.

However, this conventional vertical internal combustion engine with overhead valves has problems as follows:

1. The position for installing spark plug 24 is limited. That is, since suction port 137 and exhaust port 138 are open on both sides of cylinder head 1B, the position for disconnecting an ignition plug inserted in the cylinder head must be turned upward at as sharp an angle as possible away from exhaust port 138 so as to facilitate maintenance. This is because exhaust port 138 is heated by exhaust heat when the engine is being actuated.

2. The combustion chamber of cylinder head 1B cannot be cooled down sufficiently.

3. The exhaust system, which is to the leeway of cooling air, may not be cooled down sufficiently. Among other things, it is impossible to cool down the part around the exhaust valve, and the valve guide may fall off due partly to the difference in thermal expansion between the valve guide and the cylinder head both of which are fixed in the cylinder head.

4. The grade of suction port 137 goes upward, and fuel in the form of fluid drops tends to flow back toward carburetor 14.

OBJECT AND SUMMARY OF THE INVENTION

In order to accomplish the above stated objectives, the object of the present invention is to provide a vertical internal combustion engine with overhead valves in which the fluidity of the air-fuel mixture in the engine is improved, and the cooling effect of cooling air is enhanced, and ease of maintenance is improved.

According to the first embodiment of the invention, a vertical internal combustion engine with overhead valves is provided wherein a crankshaft is vertically arranged and a cylinder is horizontally arranged. In the internal combustion engine a carburetor is arranged on a side of the cylinder opposite the carburetor, a suction port connected with the carburetor runs along a horizontal straight line to form a straight horizontal portion and runs along a curve to form a curved portion, and the shaft center of the straight horizontal portion and the shaft center of the carburetor are aligned at the same horizontal level. A center line of an exhaust port, which exhaust port is connected with the muffler, goes through an exhaust valve and crosses the horizontal straight line diagonally from below.

According to the second embodiment of the invention, a vertical internal combustion engine with overhead valves is provided wherein a crankshaft is vertically arranged and a cylinder is horizontally arranged. A carburetor is arranged on one side of the cylinder and a muffler is arranged on the other side of the cylinder opposite the carburetor. A suction valve is arranged in a lower part and an exhaust valve is arranged in an upper part. On one side of the cylinder head, a suction port is connected with a suction valve and a carburetor is connected with the suction port. A center line of the exhaust valve passes through the exhaust port and crosses the horizontal line diagonally from above when the exhaust port opens.

A muffler is preferably installed directly in the exhaust port according to the second embodiment of the invention and the muffler functions as a guide for cooling air.

According to the first embodiment of the present invention, favorable results are attained, including:

(1) Since an exhaust port is open on the lower surface of a cylinder head, a curved muffler may be installed over the left side of the cylinder head, whereby a higher degree of freedom for arranging an ignition plug may be obtained.

(2) Part of an exhaust port, as in the conventional engine, does not exist in the passage of cooling air, thereby causing cooling air to flow smoothly, whereby the combustion chamber around the ignition plug may be cooled down completely.

(3) The cooling air flows further into the part around an exhaust valve, thereby preventing overheating from occurring in a valve guide.

(4) The exhaust port in the cylinder head is shorter than the conventional one and heat may not escape from a muffler due to a gasket, whereby the exhaust system in the cylinder head accumulates less heat.

(5) Since the shaft center of a carburetor and the shaft center of the horizontal straight line of the suction port are arranged almost on the same straight line of the same horizontal surface, the air-fuel mixture keeps flowing in a stable manner. In addition, the lower hole of the tapped hole for installing a carburetor prevents castings, a blow hole in the tapped hole is never made.

According to the second embodiment of the invention along with the muffler installed directly to the exhaust port, favorable results are attained including:

(1) Since an exhaust port is open on top of a cylinder head, that is, the pathway of cooling air, and a muffler is curved around the lower part of the left side of the cylinder head, a higher degree of freedom for arranging an ignition plug is obtained and ease of maintenance is facilitated.

(2) Since the exhaust port (having the high temperature of the cylinder head) is at a front side of the pathway of cooling air (in the direction of A in FIG. 6), the whole cylinder head may be effectively cooled down.

(3) The cooling air flows directly around an exhaust valve, thereby preventing an overheating in a valve guide.

(4) The exhaust port of the cylinder head is shorter than the conventional one and heat may not escape from a muffler due to a gasket, whereby the exhaust system in the cylinder head accumulates less heat and a cooling effect is improved. In addition, since the muffler itself is a guide for cooling air, the muffler may be effectively cooled down.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
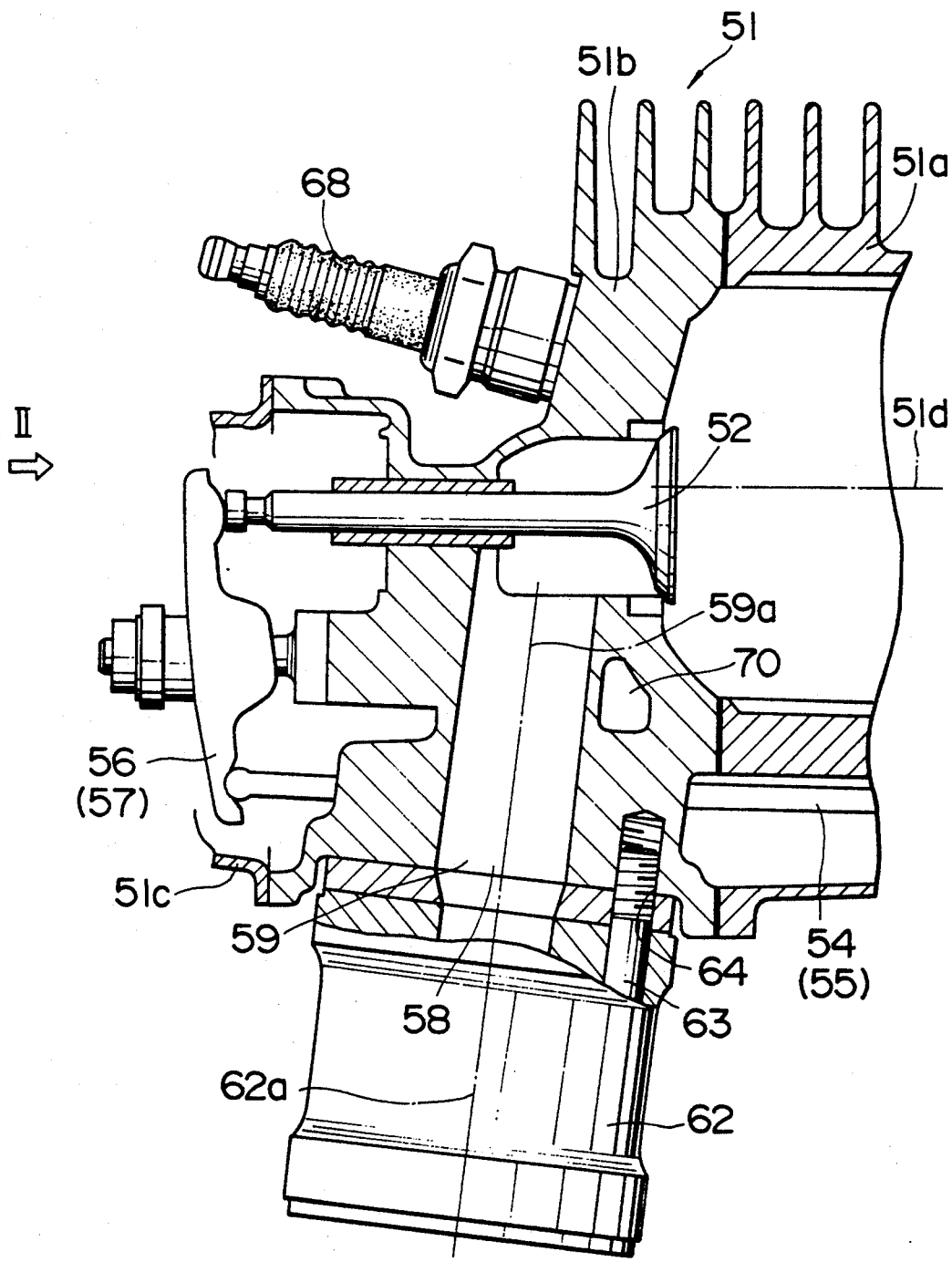
FIG. 1 is a fragmentary, cross-sectional view of a vertical internal combustion engine with overhead valves according to a first embodiment of the present invention.

Referring now to FIG. 1 through FIG. 4 in detail, a description is given of the first embodiment of the present invention which includes a cylinder block 51 comprising cylinder barrel 51a, cylinder head 51b, and cylinder-head cover 51c. The cylinder barrel 51a is provided with a horizontal center line 51d.

A suction valve 52 and an exhaust valve 53 are provided. Both the suction valve and exhaust valve are arranged as a pair of overhead valves in the upper and lower parts of cylinder head 51b.

A pair of push rods 54 and 55 are arranged in both the upper and lower parts. The push rods 54, 55 are caused to shuttle as a camshaft rotates synchronously with a crankshaft (not shown in any figure). The camshaft, push rods 54 and 55, and a pair of rocker arms 56 and 57 caused to move up and down by the actuation of the rods 54 and 55, constitute a valve mechanism.

Figure 4:
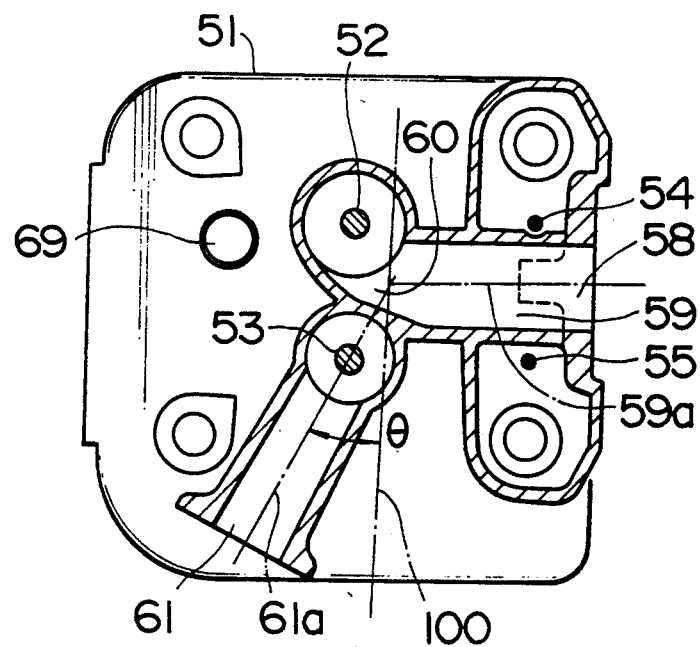
FIG. 4 is a vertical, cross-sectional view of a suction port and an exhaust port in the cylinder head according to the first embodiment of the invention.

58 is a suction port and, as shown in FIG. 4, the suction port 58 is open on the right side of the cylinder head 51b.

The suction port 58 is formed along a horizontal, straight line 59a to provide a horizontal straight line portion 59 and along a curve or curve portion 60. The curved portion 60 is connected with suction valve 52 and the horizontal straight line portion 59 is connected with carburetor 62. An opening 70 is provided for admitting cooling air and allowing cooling air to pass in the direction of an output shaft (both upward and downward). The opening 70 is surrounded on the crankcase side by the wall of the horizontal straight line portion 59, the wall where a cylinder is installed, and the circumferential wall of the opening for push rods. An exhaust port 61 is provided with a center line 61a passing through a center of exhaust valve 53 and crossing horizontal straight line 59 of suction port 58 diagonally from below. In FIG. 4, exhaust port 61 is tilted at an angle of 5° to 45° between the center line 61a and the center line 100 of the crankshaft.

The suction valve 52 and the exhaust valve 53 are arranged parallel to each other on the same vertical surface, and the suction valve 52 is in a higher position (in a vertical direction). The horizontal straight line portion 59 passes between push rod 54 for the suction valve and push rod 55 for the exhaust valve. A carburetor 62, and a shaft center 62a of the carburetor are aligned on the same straight line as shaft center 59a of horizontal straight line portion 59 in suction port 58. In FIG. 1, carburetor 62 is fixed to cylinder head 51b by screwing bolt 63 into tapped hole 64 arranged in a hole (for preventing castings) of cylinder head 51b. A muffler 65 is provided comprising right body 65a and left body 65b, and right body 65a is fixed all over left body 65b. Muffler 65 is installed by fixing nut 67 around bolt 66 in exhaust port 61. A part 65c made on the left body 65b is provided for fixing. An ignition plug 68 is provided screwed into tapped hole 69 of cylinder head 51b.

In a vertical internal combustion engine with overhead valves comprising the above stated elements, the air-fuel mixture made in carburetor 62 passes along horizontal straight line portion 59 and up curved portion 60 in suction port 58, and suction valve 52 opens, guiding the mixture into the cylinder. At this time, the air-fuel mixture cools down exhaust gas, because curved portion 60 is close to exhaust port 61. Curved portion 60 causes the air-fuel mixture to slew around and guides the air-fuel mixture into the cylinder.

Figure 2:
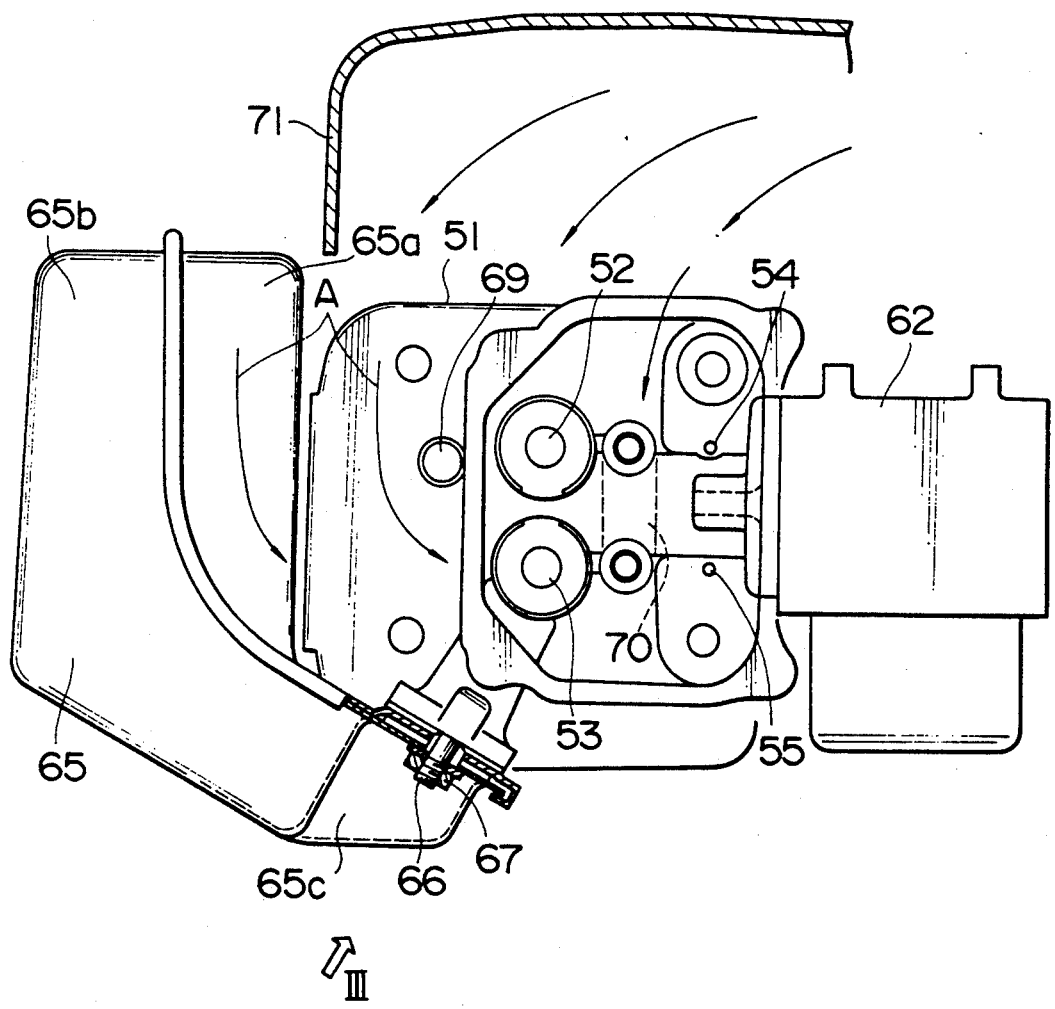
FIG. 2 is a view seen from the direction of II in FIG. 1.
Figure 3:
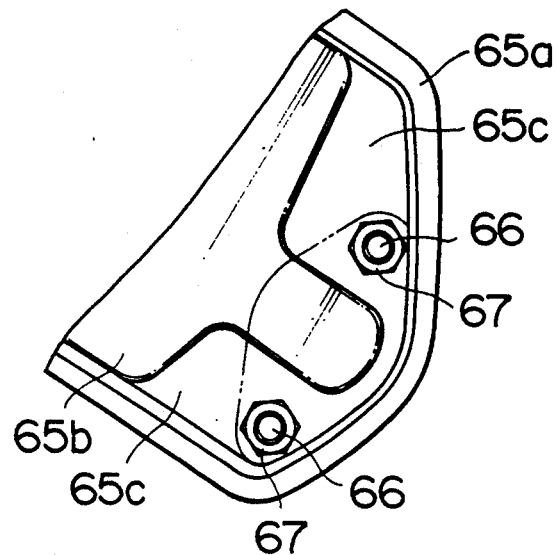
FIG. 3 is a view seen from the direction of III in FIG. 2.

In addition, since shaft center 62a of carburetor 62 and shaft center 59a of the horizontal straight line portion of the same horizontal surface, the air-fuel mixture keeps flowing in a stable manner. After this, when exhaust valve 53 opens, exhaust gas flows from the cylinder into muffler 65 through exhaust port 61, wherein the gas is muffled and emitted. Here, not only because exhaust port 61 slopes up to suction port 58 and is opened downward, but also because muffler 65 is fixed directly to cylinder head 51b without an exhaust pipe, the muffler may be arranged over the lower part and the side of cylinder block 51, as shown in FIG. 2, thereby enlarging the capacity of the muffler and improving a muffling effect.

After this, as shown in FIG. 2 again, cooling air coming from a cooling fan (not shown in any figure) flows in the direction of ↓ A inside baffle plate 71, cooling down ignition plug 68 fixed in tapped hole 69, cylinder head 51b, etc. At this time, since low-temperature cooling air from baffle plate 71 flows directly to ignition plug 68 and cools down the part around the plug, the combustion chamber around ignition plug 68 may be sufficiently cooled down.

In addition, the cooling air cools sufficiently a valve guide of exhaust valve 53, whereby exhaust valve 53 and its valve guide may be prevented from seizure.

The first embodiment of the present invention includes the above stated elements and produces the following effects:

(1) An exhaust port is open in the lower part of a cylinder head and a curved muffler may be arranged over the left side of the cylinder head, whereby a higher degree of freedom for arranging an ignition plug may be obtained and maintenance may be facilitated.

(2) Part of an exhaust port, as in the conventional engine, does not exist in the passage of cooling air, thereby causing cooling air to flow smoothly, whereby the combustion chamber around the ignition plug may be cooled down completely.

(3) The cooling air flows further into the part around an exhaust valve and prevents the overheat in a valve guide, whereby a valve guide never falls off.

(4) The exhaust port in the cylinder head is shorter than the conventional one and heat may not escape from a muffler due to a gasket, whereby the exhaust system in the cylinder head accumulates less heat, thereby enhancing a cooling effect.

(5) The shaft center of a carburetor and the shaft center of a horizontal straight line portion of a suction port are aligned almost on the same straight line of the same horizontal surface, whereby the air-fuel mixture in the engine keeps flowing in a stable manner and high output is possible. In addition, the lower part of the tapped hole for installing a carburetor may prevent castings, a blow hole in the tapped hole is never made.

Figure 5:
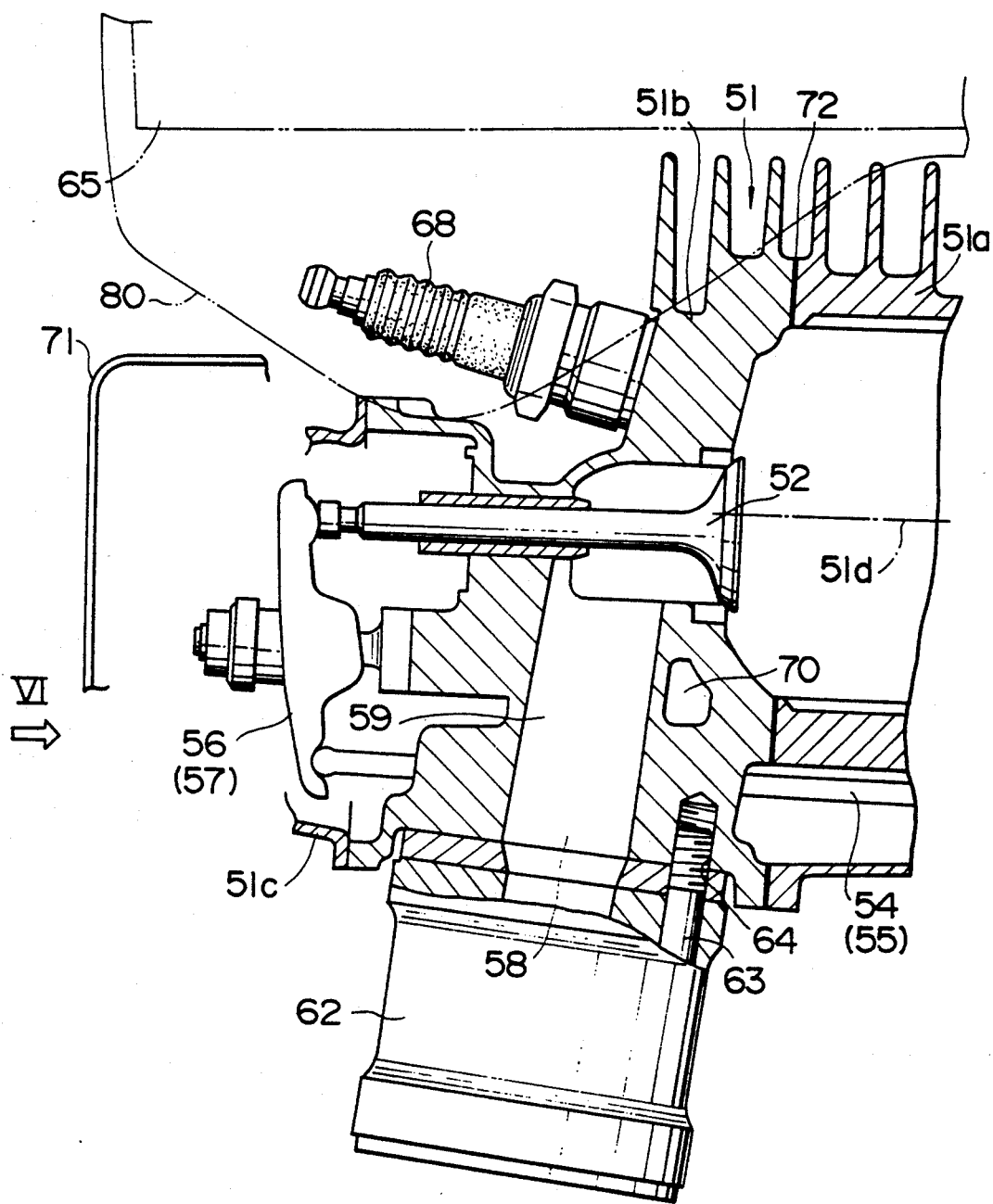
FIG. 5 is a fragmentary, horizontal, cross-sectional view of a vertical internal combustion engine with an overhead valve according to the second embodiment of the present invention.
Figure 7:
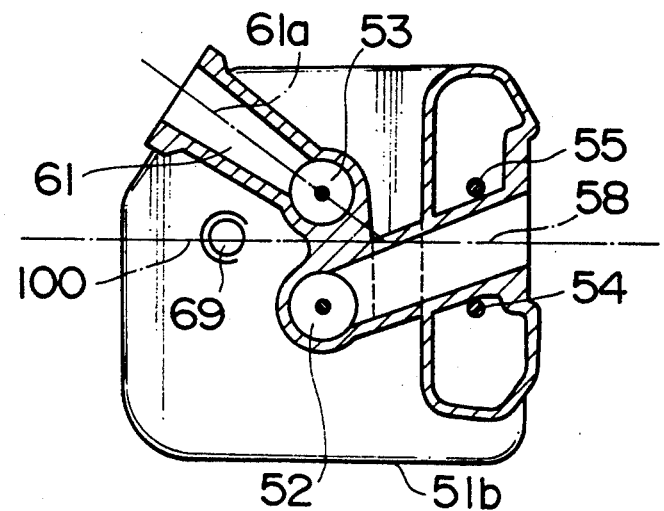
FIG. 7 is a vertical, cross-sectional view of a suction port and an exhaust port in the cylinder head according to the second embodiment.

Referring now to FIG. 5, through FIG. 7 in detail, a description is given of the second embodiment of the present invention. According to this second embodiment, the fundamental constitution of cylinder block 51, suction valve 52, exhaust valve 53, and the valve mechanism is the same as that of the first embodiment. A suction port 58 is provided opening on the right side of cylinder head 51b (on the left in the Figures) whose other end is connected with suction valve 52. As shown in FIG. 5, opening 70 for allowing cooling air to pass in the direction of an output shaft is surrounded by the wall of the suction port, the wall where the cylinder is installed, and the circumferential wall of the hole for push rods. An exhaust port 61 is provided as shown in FIG. 7, with a center line 61a passing through exhaust valve 53 and crossing horizontal line 100 diagonally from above. The exhaust port 61 may cross horizontal line 100 vertically.

Figure 6:
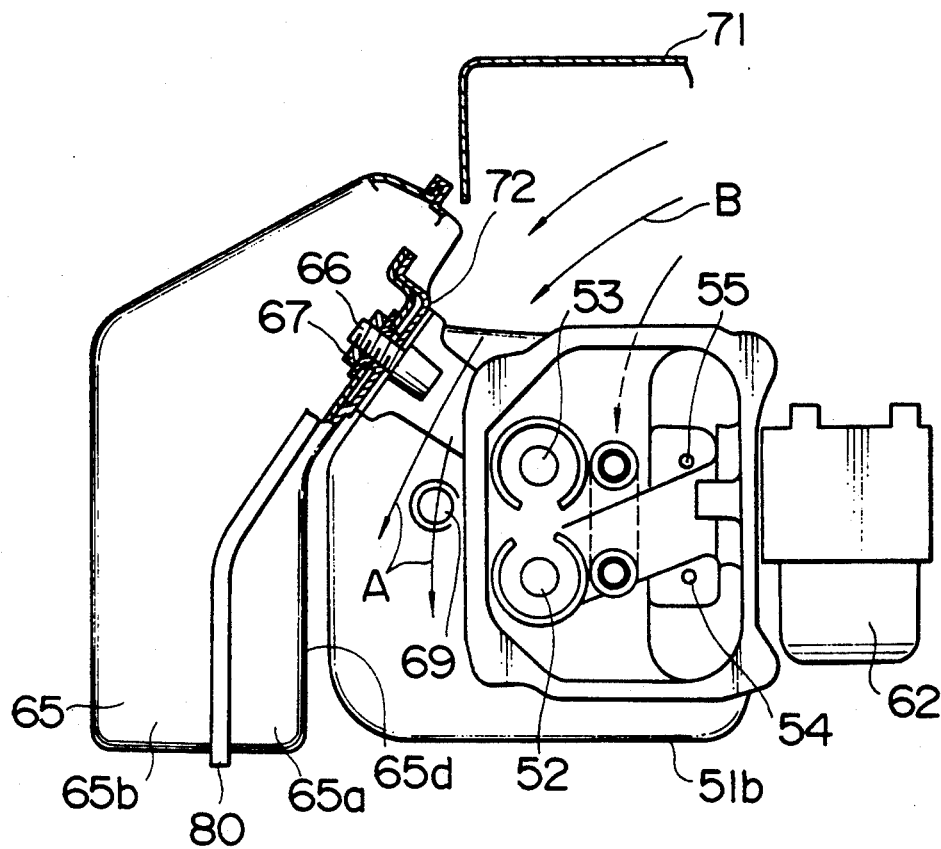
FIG. 6 is a view seen from the direction of VI in FIG. 5.

As shown in FIG. 6, the suction valve 52 and the exhaust valve 53 are arranged parallel to each other on the same vertical surface, and suction valve 52 is in the lower position.

Suction port 58 goes between push rod 54 for the suction valve and push rod 55 for the exhaust valve.

62 is a carburetor and, as shown in FIG. 5, it is fixed to cylinder head 51b by screwing bolt 63 into tapped hole 64 of cylinder head 51b.

As shown in FIG. 6, 65 is a muffler comprising right body 65a and left body 65b, and right body 65a is fixed over left body 65b. The muffler is fixed to cylinder head 51b due to bolt 66 and nut 67, and gasket 72 is placed in between.

68 is an ignition plug fixed into tapped hole 69. 71 is a fan cover and 72 is a cylinder head gasket.

Figure 8:
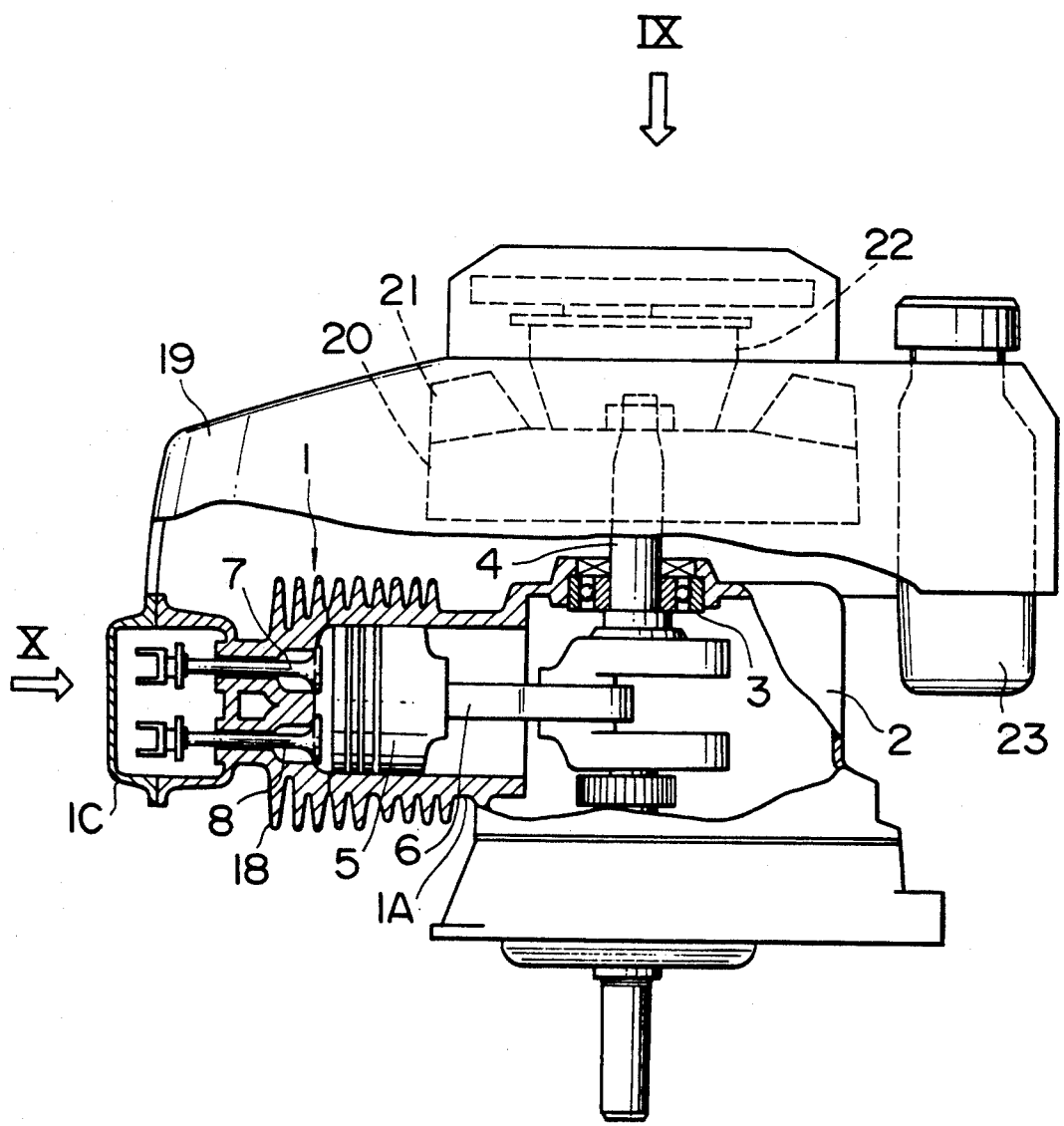
FIG. 8 is a fragmentary, broken-out side view of the conventional vertical internal combustion engine with overhead valves.
Figure 9:
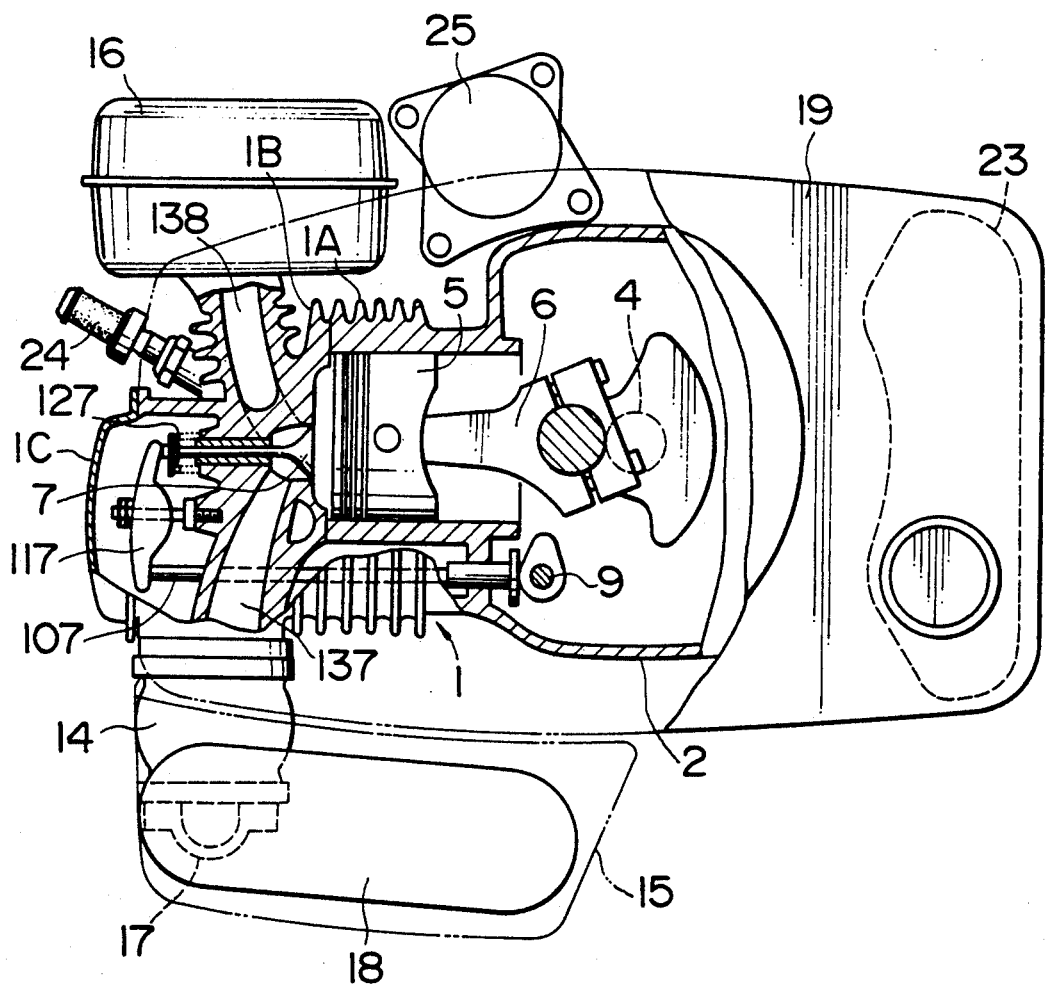
FIG. 9 is a fragmentary, broken-out top view seen from the direction of IX in FIG. 8.
Figure 10:
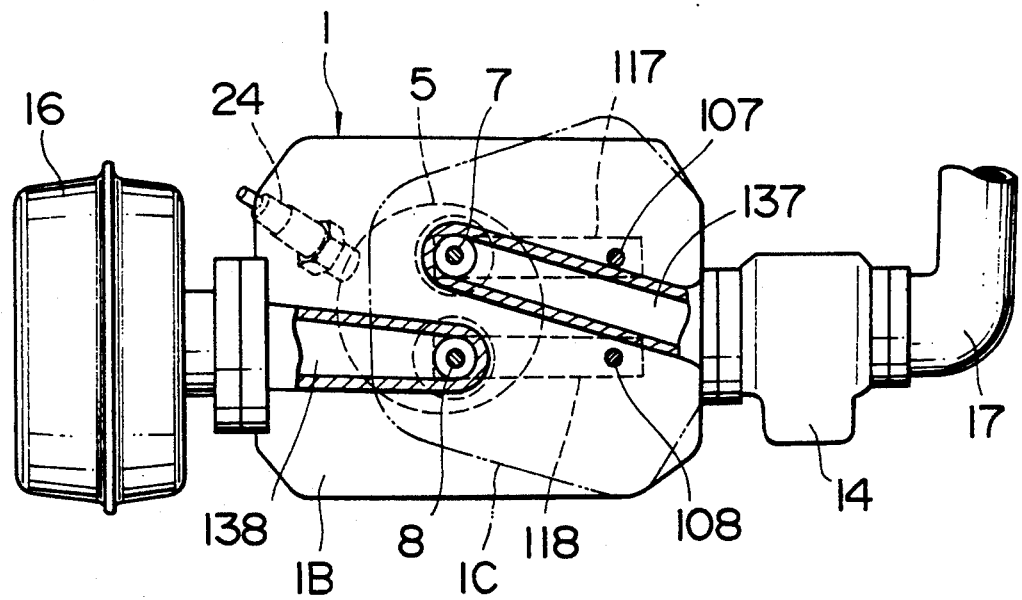
FIG. 10 is a fragmentary, broken-out from view seen from X in FIG. 8.

During the actuation of a vertical internal combustion engine with overhead valves comprising the above stated elements, cooling air sent by cooling fan 21 (shown in FIG. 8) flows in the direction of B (shown in FIG. 2) inside fan cover 71 and reaches cylinder block 51. After this, the cooling air is guided toward engine side 65d of muffler 65 and flows in the direction of A, whereby the whole cylinder head 51b, including exhaust port 61, and ignition plug 68 are cooled down.

The second embodiment of the present invention includes the above stated elements and produces the following effects:

(1) Exhaust port 61 is open on the upper part of the cylinder head and curved muffler 65 is installed over the left side of the cylinder head, whereby a higher degree of freedom for installing an ignition plug is obtained and maintenance is facilitated.

(2) Cooling air flows directly to high-temperature exhaust port 61 and muffler 65 and it is guided further around exhaust valve 53, whereby the overheat of a valve guide may be prevented and the valve guide never falls off.

(3) The exhaust port in the cylinder head is shorter than the conventional one and heat may not escape from the muffler due to a gasket 72, whereby the exhaust system in the cylinder head accumulates less heat and a cooling effect is enhanced.

While specific embodiments of the invention have been shown and described in detail to illustrate the application of the principles of the invention, it will be understood that the invention may be embodied otherwise without departing from such principles.

I claim:

1. A vertical internal combustion engine comprising:

a horizontally arranged cylinder;
overhead valves;
a vertically arranged crankshaft;
a carburetor arranged on one side of said cylinder;
a muffler arranged on another side of said cylinder, opposite said carburetor;
a suction port connected with said carburetor and forming a horizontal straight line portion and a curved portion, said curved portion leading from said horizontal straight line portion to a suction valve of said suction port;
said horizontal straight line portion being formed along a center line which substantially intersects a center of said carburetor;
an exhaust port connected with said muffler, said exhaust port including an exhaust port center line passing through an exhaust valve and crossing said center line of said horizontal straight line portion diagonally from below.

2. A vertical internal combustion engine according to claim 1, wherein said muffler is directly fixed to said cylinder head.

3. A vertical internal combustion engine according to claim 1, wherein one of said suction port curved portion and said suction port horizontal straight line portion are positioned adjacent said exhaust port and arranged sharing a common wall element.

4. A vertical internal combustion engine according to claim 1, wherein said horizontal straight line portion of said suction port passes between a pair of push rods.

5. A vertical internal combustion engine according to claim 1, wherein said suction port is arranged above said exhaust port.

6. A vertical internal combustion engine, comprising:
a horizontally arranged cylinder head;
a crankshaft arranged vertically;
overhead valves including a suction valve and an exhaust valve;
a carburetor arranged on one side of said cylinder;
a muffler arranged on another side of said cylinder;
a suction port including a horizontal straight line portion and a curved wall portion providing a gradual transition from said horizontal straight line portion to a wall of said suction port; and
an exhaust port connecting said muffler to said exhaust valve, said suction port passing between a pair of push rods, one being positioned above said suction port and one being positioned below said suction port.

* * * * *